(12) United States Patent
Siders et al.

(10) Patent No.: US 9,078,103 B2
(45) Date of Patent: Jul. 7, 2015

(54) SYSTEMS AND METHODS FOR INTERACTING WITH VIRTUAL NODES WITHIN A GEOGRAPHIC AREA

(71) Applicants: Benjamin J. Siders, Saint Peters, MO (US); Kirk A. Damman, Saint Louis, MO (US)

(72) Inventors: Benjamin J. Siders, Saint Peters, MO (US); Kirk A. Damman, Saint Louis, MO (US)

(*) Notice: Subject to any disclaimer, the term of this patent is extended or adjusted under 35 U.S.C. 154(b) by 57 days.

(21) Appl. No.: 13/943,525

(22) Filed: Jul. 16, 2013

(65) Prior Publication Data

US 2014/0024394 A1    Jan. 23, 2014

Related U.S. Application Data

(60) Provisional application No. 61/672,591, filed on Jul. 17, 2012.

(51) Int. Cl.
*H04W 24/00* (2009.01)
*H04W 4/02* (2009.01)

(52) U.S. Cl.
CPC ..................... *H04W 4/025* (2013.01)

(58) Field of Classification Search
CPC ........... H04W 4/00; H04W 8/18; H04W 8/20; H04W 4/02; H04W 48/04; A63F 13/12; A63F 2300/204; A63F 13/00; A63F 2300/69; A63F 2300/205; A63F 2300/406; A63F 2300/5573; A63F 2300/8082

USPC ....................................................... 455/414.2
See application file for complete search history.

(56) References Cited

U.S. PATENT DOCUMENTS

| | | | |
|---|---|---|---|
| 2008/0146338 A1* | 6/2008 | Bernard et al. | 463/42 |
| 2012/0021732 A1* | 1/2012 | Lam | 455/418 |
| 2012/0094641 A1* | 4/2012 | Takehara et al. | 455/414.2 |

FOREIGN PATENT DOCUMENTS

| | | |
|---|---|---|
| KR | 10-2007-0034893 A | 3/2007 |
| KR | 10-2011-0001503 A | 1/2011 |
| KR | 10-2012-0042265 A | 5/2012 |

OTHER PUBLICATIONS

International Search Report, International Patent Application No. PCT/US13/50736, mailed on Sep. 27, 2013, 10 pages.

* cited by examiner

*Primary Examiner* — K Wilford Shaheed
*Assistant Examiner* — Shantell L Heiber
(74) *Attorney, Agent, or Firm* — Lewis Rice LLC

(57) ABSTRACT

Systems and methods for playing video games on mobile devices wherein the elements of a virtual video game world are associated with locational coordinates in the real world and the placing, removing, and interacting with a video game elements depends upon the mobile device's physical proximity to the real world coordinate associated with the video game element.

1 Claim, 1 Drawing Sheet

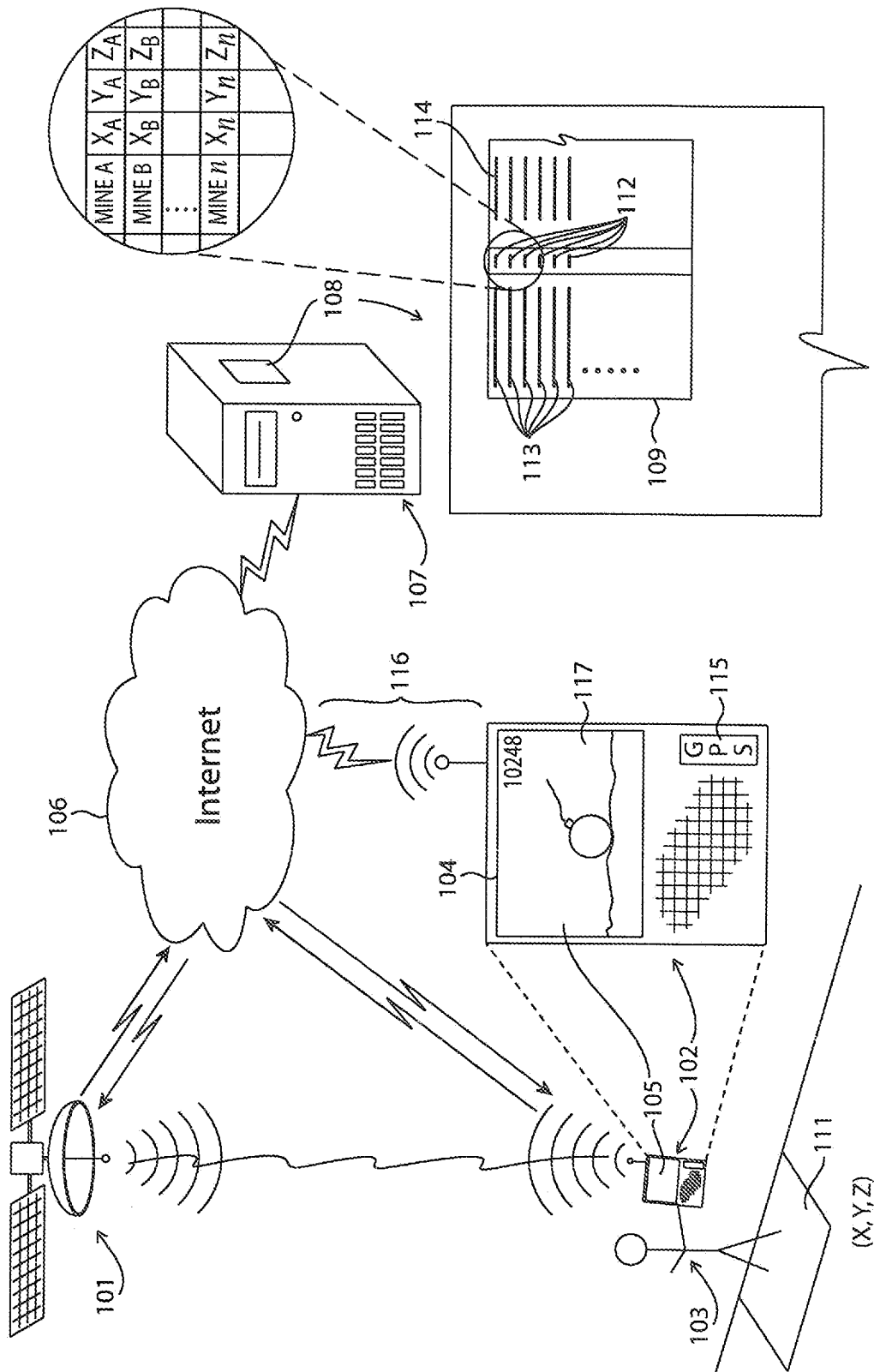

SYSTEMS AND METHODS FOR INTERACTING WITH VIRTUAL NODES WITHIN A GEOGRAPHIC AREA

CROSS REFERENCE TO RELATED APPLICATIONS(S)

This application claims benefit of U.S. Provisional Patent Application No. 61/672,591, filed Jul. 17, 2012, the entirety of which is expressly incorporated herein by reference.

BACKGROUND

1. Field of the Invention

This disclosure is related to the field of software applications and mobile computing, particularly software for entertainment purposes such as playable video games on mobile devices capable of determining their approximate location on, in, or above the Earth.

2. Description of the Related Art

Mobile devices are now commonly equipped with geolocation capabilities. Geolocation is, for purposes of this application, the ability for hardware or software to determining the approximate locational coordinates of a person, device, or other thing in, on, or above the Earth. While any device capable of geolocation using any geolocation technology or system is specifically contemplated herein, at present most geolocation technology makes use of orbiting satellites to determine the location of a geolocation receiver on Earth. Examples of these systems include GPS, GLONASS, Galileo, Beidou, COMPASS, IRNSS, and QZSS. Of these, GPS presently is the most mature and advanced system and enjoys the widest deployment and implementation on mobile devices in the United States. There are also non-satellite based geolocation systems, such as geolocation by Internet Protocol address (see, e.g., www.geobytes.com).

Geolocation technology may be included in almost any type of device. Commercial uses of geolocation technology include navigation systems, mobile phones, tablet computers, e-book readers, portable and hand-held gaming systems, portable and hand-held audio players, beepers, pagers, and laptop computers. There are also extensive non-commercial uses for geolocation technology in mobile devices, such as law enforcement and military applications, which could implement the present invention. Geolocation technology can also be implemented in devices that are not conventionally thought of as "mobile," but which nevertheless can be mobilized and/or miniaturized to make use of the present invention, including without limitation desktop PCs and console gaming systems.

Most mobile devices include a microprocessor capable of executing computer instructions to run software applications. Applications are typically loaded unto the device by the manufacturer, distributor, vendor, or end-user/consumer. This is generally done through a wire, cable, or over a wireless connection.

On many mobile devices, these applications have the ability to access and use the geolocation feature of the mobile device to determine the geolocation coordinates for the location of the device. On many mobile devices, these applications are playable video games or other types of entertainment software. On many mobile devices, these applications have the ability to communicate with other devices over a network, including the Internet, using wired and/or wireless network connections.

Despite the portability of a mobile device and the widespread access to the Internet, playing a video game on a mobile device is still a sedentary experience. The location of the player or the device at the time that the player is playing the game does not have any impact on the game play experience. That is, the game play experience is the same regardless of where the player is located at the time that the player plays the game. The only source of information about the game that is relevant to the player's gaming experience is the information displayed on the mobile device by the gaming application itself. As such, games generally require that, while the player is playing the game, the player must focus primarily or exclusively on the device itself, and not the world around him, in order to play the game successfully and fully enjoy the game play experience.

Thus, while the player is playing the game, the player must generally remain still and focused on the mobile device. If the player is not still, he either risks injury to himself or others for lack of concentration on his environment while focused on the mobile device, or he plays the game ineffectively and does not fully enjoy the game play experience for lack for concentration on the mobile device while focused on the real-world environment. This means that mobile gaming is "mobile" only in the sense that the player moves the sedentary experience of playing a video game to a location other than the player's living room, but the game play itself is not a "mobile" experience.

This is true even with motion-sensing entertainment technologies, such as the Nintendo Wii and Microsoft Kinekt, which use the motion of the player or a controller as input to the game. These are "motion"-sensing technologies, not "mobile" technologies. The player's motion may be an input but the player is still confined to a single location, such as his living room where the motion-sensing game console is located, while playing the game. Even using these motion-sensing technologies, the player still is not going anywhere and the game play experience, while involving motion, does not involve mobility.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

BRIEF DESCRIPTION OF THE DRAWING(S)

FIG. 1. shows a schematic of an embodiment of systems and methods for interacting with virtual nodes within a defined geographic area.

DESCRIPTION OF THE PREFERRED EMBODIMENT(S)

Described herein, among other things, are systems and methods for placing, detecting, removing, and otherwise interacting with an element of a computer application running on a mobile device, where the player's interaction(s) with an element of the game is governed at least in part by the relationship between a geographic location in the real world associated with that element and the geographic location of the player's mobile device running the computer application. This is done by using the geolocation capability of a mobile device in an application such that some or all of the interactive game elements are associated with a geolocation coordinate in the real world, and the application determines which of these elements the user may interact with by comparing the geolocation coordinates of the mobile device with the geolocation coordinates associated with the game elements, and allowing the player to interact only with the game elements whose geolocation coordinates are sufficiently proximate to the mobile device's coordinates, as defined by the rules of the application, for the player to interact with those game element.

In this manner, the real world because the "game board" for the game and the invention thus incorporates the real world into the game play experience. That is, the real-world environment in which the player is located at the time that he is playing the game is itself an input to the game such that the game play experience is fully or partially dependent on that location. The present invention thus allows gaming to become truly "mobile" in that the player's focus and concentration is on his surroundings and real-world environment and on moving from location to location, and not merely focusing on the screen of a mobile device while away from home.

This disclosure is intended to teach by way of example and not by way of limitation. As a preliminary matter, it should be noted that while the description of various embodiments of the system and method will discuss application of the system primarily in the context of games and entertainment on mobile phones, this in no way limits the application of the system to use in only games and entertainment applications, nor to mobile phones. Rather, any application which could utilize the present invention is contemplated, and any device capable of accompanying the user is contemplated.

The preferred embodiment of the invention is a playable video game or entertainment software application, but any application capable of implementing the present invention is contemplated.

For sake of clarity, all software applications utilizing the present invention, whether or not a playable video game or entertainment software application, shall be referred to herein by the shorthand terms "geogame" or "geogaming."

The term "remote server" should be understood to mean one or more computer systems accessed over a network which provide services in support of a geogame such as remote servers, database servers, authentication servers, and the like. While in the preferred embodiment, remote servers are used for storage and retrieval of game data and the implementation of the geogame's rules and logic, these functions may be served in a manner other than through network communication with a remote server. By way of example and not limitation, game data and/or program logic may be stored, retrieved, and executed from local storage or memory, such as storage media included in the mobile device or a device connected to the mobile device, such as by cable, direct coupling, or a short-range wireless protocol, such as Bluetooth. For sake of simplicity, the invention shall be described with reference to the preferred embodiment wherein a remote server is utilized, but such references should be understood to include other implementations as well.

The term "application" should be understood to include both the actual application and/or interface running on the mobile device and software running on other devices as well in support of the application, such as remote servers.

FIG. 1. shows a schematic of an embodiment of systems and methods for interacting with virtual nodes within a defined geographic area. A user (103) has a mobile device (102) with a display (105), and the display displays the user interface (117) for a geogaming application (104). The real-world location (111) of the mobile device (102) is determined using the geolocation receiver (115) in the mobile device (102) and a geolocation system (101), such as GPS. The real-world coordinates (111) of the mobile device (102) are transmitted to the remote server (107) through the mobile device's (102) wireless network connection (116) to a network (106) such as the Internet. The remote servers (107) consult the master list (109) of game elements (113) stored in the remote server's (107) memory (108), and the remote servers (107) compare the locational coordinates (111) of the mobile device (102) to the locational coordinates (112) associated with the game elements (113). The remote servers (107) determine which game elements (113) have locations (112) close enough to the mobile device's (102) location (111) that the user (103) can interact with those game elements (112). Data about the qualifying game elements (114) is transmitted back to the mobile device (102) through the network (106) using the device's (102) wireless network connection (116), and the geogaming application (104) processes the data and updates the user interface (117) to display that data on the display (105) of the mobile device (102) according to the rules and design of the application (104). Once the user (103) has a list of nearby game elements (112), he can use the user interface (117) to attempt to interact with them. When the user (103) attempts to interact with a particular game element (113) through the user interface (117), the application (104) will send data identifying the particular game element (112) and such other data as is necessary according to the rules of the game to determine the result (if any) of the interaction, to the remote server (107) through the mobile device's (111) wireless network connection (116) to the Internet (106). The remote servers (107) again verify that the mobile device (102) is close enough to that particular game element (113) by comparing the location (111) of the device (103) to the location (112) associated with that particular game element (112), and if the distance is appropriate according to the game rules, the remote servers (107) will determine the outcome of the interaction, update the master list (109) in memory (108) as necessary, and transmit updated game state information back to the mobile device (103) through its wireless connection (116) to the internet (106). If the distance is not appropriate according to game rules, the remote server (107) will not change the game state information in the master list (109), and may optionally transmit to the mobile device (103) through its wireless connection (116) to the internet (106) an error code, message, or other information about the distance not being appropriate. Although the gameplay experience of the mobile application (104) is generally comprised of a series of the transactions described above, not all user (103) interactions with the mobile application (104) will require that the application (104) communicate with the remote servers (107), as certain data may be cached locally on the mobile device (102), or the game rules simply may not necessitate server (107) communication. It should also be noted that the remote server (107) memory (108) generally will contain multiple sets of authoritative data (109) in addition to the authoritative list (109) of game elements (113) and locations (112), to reduce or prevent user (103) tampering or hacking.

The specific implementation of a geogame will vary, but the general architecture is that a geogaming application runs on the mobile device and the application provides to the player a user interface displaying information about the current state of the game according to the game rules and the player's current location. The geogaming application detects the real-world locational coordinates of the mobile device using the mobile device's geolocation capability and transmits those locational coordinates, along with additional information if and as required by the application, to a remote server over a network. The remote server contains an authoritative master list of the game elements and their associated real-world locational coordinates and can determine, using the game rules and locational coordinates of the mobile device, the game elements with which the user may detect or otherwise interact. Generally, this determination will involve a calculation of the mobile device's physical proximity to the real-world locational coordinates associated with each game element and, optionally, other factors depending on the rules of the particular geogaming application.

After the remote server determines which game elements the user may detect and/or interact with, the remote server transmits information about these game elements, typically their location and, optionally, any other information required by the rules of the particular geogaming application, the mobile device over the network.

The geogaming application on the mobile device processes this information according to the rules of the particular geogame, generally by displaying to the user some indication or representation of the game elements with which the user may interact and their location in the real world, along with such other options and choices available to the user for interacting with each game element, as allowed by the rules of the particular geogaming application.

Depending on the user's distance from the locational coordinates associated with any particular game element, the user may need to physically move toward (or away from, as the case may be) those locational coordinates in order to interact with the associated game element.

When the user elects to interact with a particular game element, the locational coordinates of the mobile device are again transmitted to the remote server over the network. The remote server will calculate the physical proximity of the mobile device's locational coordinates to the locational coordinates associated with the particular game element with which the user elected to interact.

If that distance is not appropriate for the requested interaction, as defined by the rules of the particular geogame, the remote server software will not process the requested interaction. Optionally, the remote server may transmit to the mobile device information that the user's location is inappropriate for the requested interaction, such as by sending an error code or error message, which the application on the mobile device may then optionally convey in some fashion to the user.

If that distance is appropriate for the requested interaction, as defined by the rules of the particular geogame, the remote server will process the requested interaction, determine the outcome of the interaction according to the rules of the particular geogame, and update the game state information in the master list as necessary to reflect the outcome of the interaction. By way of example and not limitation, this update may include adding, removing or modifying the game elements in the authoritative master list, or adding, removing, or modifying other game data. The remote server generally transmits the updated game state information to the mobile device application software over the network, and the mobile device may convey this updated information to the user in some fashion, such as by reflecting the changed game state in the user interface. The remote server optionally may also determine if any other players should be provided with the updated game state information and, if so, for each such user, transmits the updated game state information to the mobile device for those users.

Not all users of the geogaming application need to share access to the same set of game elements in the game. In an embodiment, a player can request, setup, create, or otherwise form a "private game" and limit which other players may have access to the game elements associated with that "private game." By way of example and not limitation, a player may limit the other players by quantity, identity, proximity, or any other filter allowed or implemented by the particular geogaming application. This "private game" is known as an "instance" of the game.

The game elements in different "instances" are not accessible to players who are not invited or approved to participate in that instance. However, in an embodiment, a game may implement "spectator" rules where non-participants in the game may be able to detect and monitor the game elements, game state, and/or the progress of the players.

The locational coordinates for the set of game elements associated with a given instance may or may not overlap with the locational coordinates for the set game elements associated with any other instance, depending on the particular geogaming application.

The possible coordinates in the real world with which a game element can be associated may be confined to a specific geographical region.

This may be made possible by allowing the user to select a pre-defined location whose coordinates are already known, such as "Central Park, New York."

The player may also define the possible coordinates by "fencing off" a gaming location using a user interface, such as by drawing a closed polygon on a map whose interior is the set of all possible locational coordinates for the game elements.

The player may also define the possible coordinates by "fencing off" a gaming location using a mobile device to set the vertices of a closed polygon the device. The player does this by physically moving to each real-world location that is a vertex of the closed polygon whose interior is the set of all possible locational coordinates for the game elements, and using the mobile device to set a "fencepost" at each such vertex. By way of example but not limitation, if the player wishes to create an instance where all game elements are located within a football field, the player goes to one corner of the field, and sets a "fencepost," and then to an adjacent corner and sets a "fencepost," and so forth until the player has visited each of the four corners. Once done, the application determines whether the coordinates form a closed polygon and, if so, the playing "field" is established.

The game elements may be randomly or automatically generated by the application or may be placed, set, or otherwise created and defined by human users, including without limitation players and administrators.

A given geogame may offer additional features, depending on the supported features of the particular mobile device. For example, a device with an accelerometer, such as an iPhone, which is capable of detecting the device's orientation and motion, may require the player to perform some physical action with the device in order to interact with game elements. By way of example and not limitation, the device may have to be oriented lengthwise and twisted to simulate the unlocking of a door with a key, or held in the palm and flipped forward, as though lobbing a rock. By way of example and not limitation, the mobile device may provide vibrational feedback, or use other features, such as a built-in camera, camera flash, light, for a particular geogame.

To void data clutter, a game instance with whose game elements no user has interacted for some pre-determined period of time may be automatically removed from the data server.

Games may be single-player or multi-player.

The range of behavior of a given game element is nearly limitless. By way of example and not limitation, game elements may be spontaneously created or destroyed, in pre-defined or random locations, have pre-defined or random attributes or characteristics, may be fixed in one location, may wander on a predetermined or random path or in response to use movement or interaction, players may be able to move them, destroy them, alter them, create them, and/or clone them. A game element may have artificial intelligence.

A particular geogame may feature badge and achievement systems whereby players collect accolades by accomplishing certain feats within the game, which may but need not be associated with particular locations or locational coordinates as well.

A game element may, but need not be, analogous to a physical object. By way of example and not limitation, a geogame may allow the player to acquire or improve certain virtual goods within the application only while the mobile device's locational coordinates are sufficiently proximate to a particular location. By way of example and not limitation, the user may only be able to purchase a "chainsaw" weapon in the geogame while he is physically located in or near a hardware store in the real world. By way of example and not limitation, the user may only be able to improve the "chainsaw" weapon in the geogame if he is physically located in or near a specific hardware store.

In an embodiment of the invention, the game elements may be located anywhere on, in, or above the Earth, limited only by the range or set of locations for which geolocation is possible.

In an embodiment of the invention, the game elements may be located in a defined geographic region. By way of example and not limitation, this region may be an office building, elementary school, public park, parade route, or any other shape or configuration or set of shapes or configurations.

In an embodiment of the invention, all users of the game application share a single pool of game elements to interact with.

In an embodiment of the invention, different subsets of the users of the game application share separate and independent pools of game elements, such that there are multiple "instances" of the game taking place, which may or may not overlap in geographical space, and the users not participating in a given instance cannot interact with the pool of game elements shared by the users who are participating in that instance.

In an embodiment of the invention, the players are in competition with each other.

In an embodiment of the invention, the players are in cooperation with each other.

In an embodiment of the invention, an instance of the game is limited in duration such that the game expires at a certain time or upon the happening of a certain condition, and no further interaction with the elements associated with that instance is possible by a user.

In an embodiment of the invention, a user can define the real-world geographical locations in which the game takes place.

In an embodiment of the invention, a user can define the real-world geographical locations in which the game takes place using an interface to draw, set, or otherwise enter or define the vertices of a closed polyhedron such that all game elements must be associated with a location within the interior of the closed polyhedron.

In an embodiment of the game, certain actions can be taken only when the player is in a specific location. For example, a player in an adventure roleplaying application may be able to safely store and retrieve equipment in the game only while the mobile device is located at his home.

In an embodiment of the invention, the coordinates of the game elements are determined, generated by, and/or stored on the mobile device's memory systems.

In an embodiment of the invention, coordinates of the game elements are determined, generated by, and/or stored on a remote server or application server.

In an embodiment of the invention, the mobile device receives the coordinates or other game data from a remote server over a network, and the remote server maintains a master list of the game's elements and locations which is updated in response to user actions which add, remove, or change the elements and/or locations.

In an embodiment of the invention, an application using the above remote server operates in the absence of a network by caching locations during periodic updates and transmitting user actions to the remote server while the application has access to the network.

In an embodiment of the invention, the network is the Internet.

In an embodiment of the invention, the rules and logic for playing the game are primarily or exclusively contained on a remote server.

In an embodiment of the invention, the user interface to the game is an application running on the mobile device.

In an embodiment of the invention, the user interface to the game is a web site accessible on the mobile device.

In an embodiment of the invention, accelerometers or other motion-sensing technologies are used to incorporate player gestures or to otherwise incorporate the orientation of the mobile device into the game rules or game play experience.

In an embodiment of the invention, a user can place game elements, using the current location of the mobile device, or by otherwise defining or setting the location of an element.

While the preferred embodiment of the invention is as a playable video game or entertainment software application, there are many types of implementations which can make use of this invention. By way of example and not limitation, these include the aforementioned minesweeper game, Easter egg hunts, a bomb squad game, adventure games, virtual tag, role-playing games (including MMORPG-style games), treasure hunts and treasure maps, geo-caching, sports, Quiddich, "invisible ink" and hidden messages, mysteries and problem- or puzzle-solving games, live-action board games, self-guided walking tours, team-building exercises, and orienteering.

By way of example and not limitation, an embodiment of the present invention is a "minesweeper" game in which the player detects and neutralizes virtual mines. Each "mine" will have a real-world locational coordinate associated with it and players will not be able to interact with any given "mine" (e.g., attempt to disarm it) in the game software on their mobile device unless the device itself is sufficiently physically proximate, as defined by the game rules, to the real-world location associated with that particular virtual mine.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for playing a video game comprising:
providing a mobile device carried by a user and having a display and video game software, said mobile device communicating over a data network, and said mobile device communicating with a geolocation system;
providing a database having data about one or more game elements, said data including a geolocation coordinate for each of said one or more game elements;
providing a remote server communicating over a data network and communicating with said database;
said mobile device determining its geolocation coordinates with said geolocation system;
in response to said user moving a distance such that said mobile device detects a change in the geolocation coordinates of said mobile device, said mobile device determining the new geolocation coordinates of said mobile device and transmitting said new geolocation coordinates to said remote server;
in response to receiving said transmitted geolocation coordinates, said remote server selecting one or more of said one or more game elements from said database, said selection based at least in part upon a comparison of said received geolocation coordinates to said geolocation coordinates for each of said one or more game elements;
transmitting to said mobile device data about said selected game elements, said data about said selected game elements comprising said geolocation coordinates for each of said selected game elements;
in response to receiving said data about said selected game elements, said video game software causing said mobile device to display on said display a user interface, the content of said user interface based at least in part on at least one of said geolocation coordinates for each of said selected game elements;
in response to a user interaction with said video game software, said mobile device determining the geolocation coordinates for said mobile device at the approximate time of said user interaction and transmitting to said remote server said geolocation coordinates for said mobile device at the approximate time of said user interaction, and transmitting to said remote server data about said user interaction;
in response to receiving said transmitted geolocation coordinates and said data about said user interaction, said remote server selecting one or more of said one or more game elements from said database, said selection based at least in part upon said data about said user interaction and a comparison of said received geolocation coordinates to said geolocation coordinates for each of said one or more game elements;
transmitting to said mobile device data about said selected game elements;
in response to receiving said data about said selected game elements, said video game software causing said mobile device to display on said display a user interface, the content of said user interface based at least in part on at least one of said geolocation coordinates for each of said selected game elements,
in response to receiving said data about said selected game elements, said video game software causing said mobile device to present a user interface, the content of said user interface based at least in part on said user interaction and at least one of said geolocation coordinates for each of said selected game elements.

* * * * *